United States Patent [19]

Hieahim

[11] Patent Number: 5,085,465
[45] Date of Patent: Feb. 4, 1992

[54] AIR BAG STRUCTURE FOR AN AUTOMOTIVE VEHICLE

[75] Inventor: Isao Hieahim, Hiroshima, Japan

[73] Assignee: Mazda Motor Corporation, Hiroshima, Japan

[21] Appl. No.: 578,656

[22] Filed: Sep. 7, 1990

[30] Foreign Application Priority Data

Sep. 7, 1989 [JP] Japan .................................. 1-234323

[51] Int. Cl.5 .............................................. B60R 21/30
[52] U.S. Cl. ................................................... 280/738
[58] Field of Search ............... 280/732, 738, 743, 728, 280/727

[56] References Cited

U.S. PATENT DOCUMENTS 4,126,325 11/1978 Weman ................................. 280/738
4,153,273 5/1979 Risko ..................................... 280/743
4,842,300 6/1989 Ziomek et al. ....................... 280/732

FOREIGN PATENT DOCUMENTS 378314 7/1990 European Pat. Off. ............ 280/743
1324401 7/1973 United Kingdom ................ 280/738

Primary Examiner—Charles A. Marmor
Assistant Examiner—Tamara L. Finlay
Attorney, Agent, or Firm—Fleit, Jacobson, Cohn, Price, Holman & Stern

[57] ABSTRACT

An air bag structure for an automotive vehicle is mounted on an instrument panel in front of a passenger seated on a front seat of the vehicle. The air bag structure includes a casing enclosing an inflator and air bag. The casing is formed with a plurality of aspiration holes, through which air is introduced into the air bag when the air bag is inflated by an ignition of inflator. A cover member surrounds and covers the casing. The cover member is spaced from the casing by a predetermined distance, so that an air passage is formed between the cover member and the casing.

10 Claims, 6 Drawing Sheets

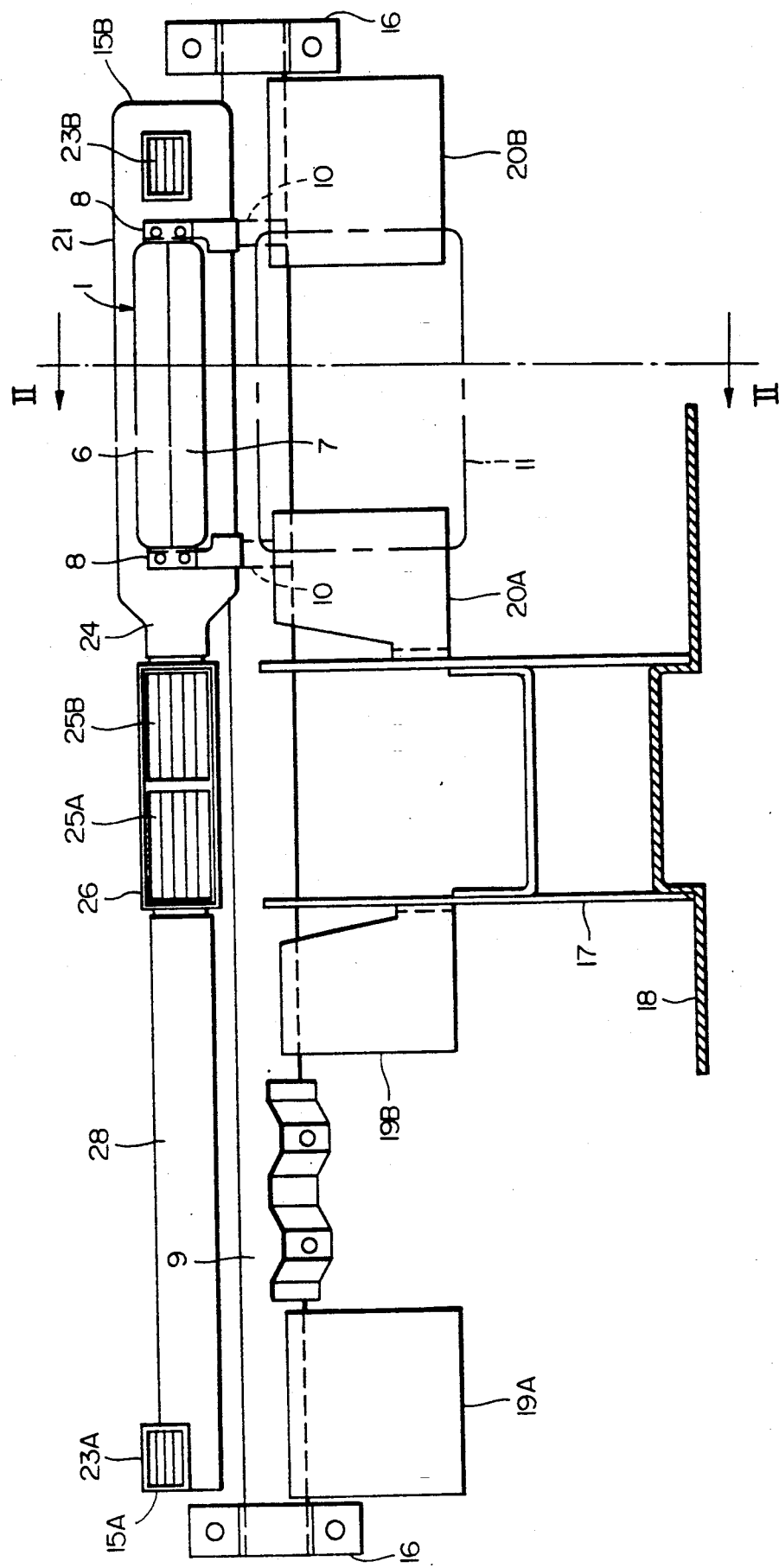
FIG. I

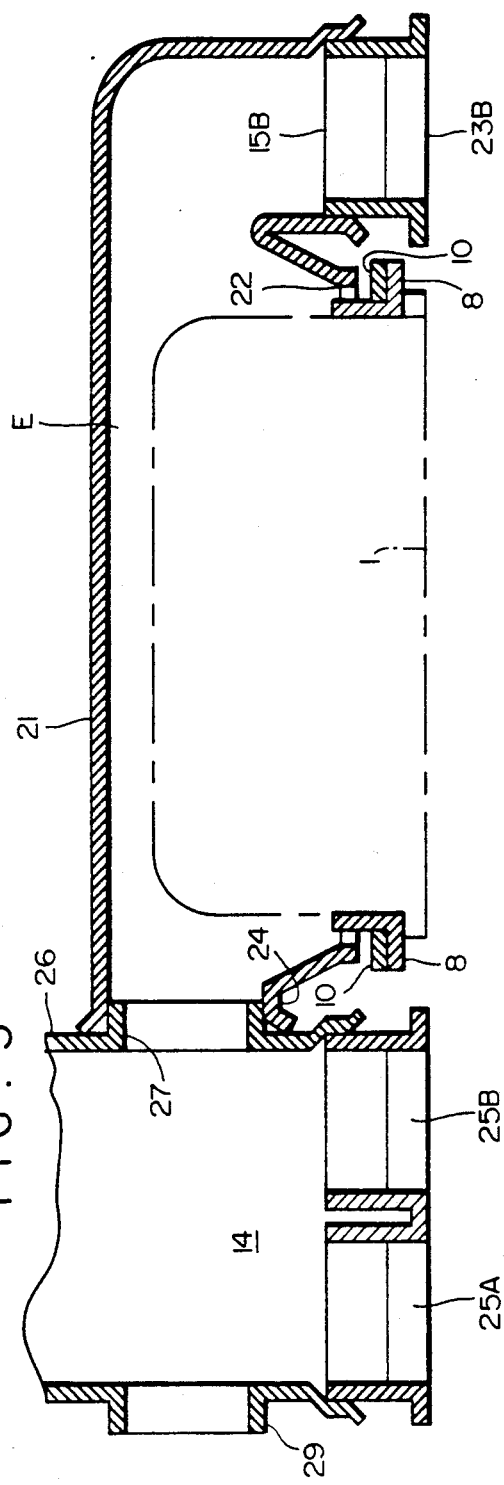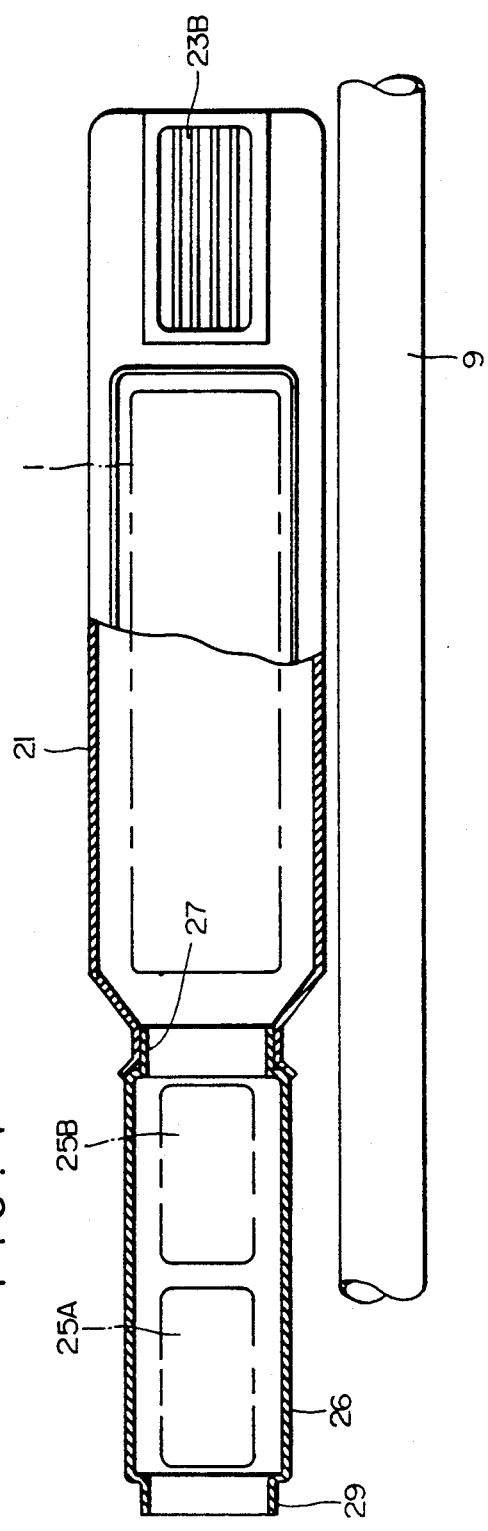

AIR BAG STRUCTURE FOR AN AUTOMOTIVE VEHICLE

BACKGROUND OF THE INVENTION (1) Field of the Invention

The present invention relates to an air bag structure for an automotive vehicle which prevents a passenger from being seriously injured when the vehicle is involved in an accident.

(2) Description of the Prior Art

Recently, electrically controlled air bag systems for automotive vehicles have been utilized to safely protect a passenger if the vehicle is involved in a car accident. For example, Japanese Laid-open Patent Application No. 62-198547 discloses such an air bag system which is provided on an instrument panel so as to face a passenger seated on a front seat next to a driver. Also, U.S. Pat. No. 4,842,300 discloses an air bag which has a plurality of aspiration holes formed on a surface of a casing for the air bag. Air around the casing is introduced through the plurality of holes into the casing when the air bag is inflated upon the detection of a collision of the vehicle. Such an air bag, having such aspiration holes, has an advantage in suppressing noise generated when the air bag is inflated and in preventing or reducing the impact load received by the passenger. However, the aspiration of air may be interrupted by various kinds of equipment and parts provided in a narrow instrument panel area.

SUMMARY OF THE INVENTION

It is, therefore, an object of the present invention to provide an air bag with a plurality of aspiration holes which can take in sufficient air smoothly through the aspiration holes and into the air bag.

It is another object of the present invention to provide an air bag with a plurality of aspiration holes which allow the bag to smoothly inflate, without generating a loud noisy sound or providing a great amount of impact load on the passenger.

BRIEF DESCRIPTION OF THE DRAWINGS

FIG. 1 is a front view, showing an air bag having a structure in accordance with the present invention;

FIG. 3 is a horizontal, cross-sectional view illustrating the relationship between the air bag and an air conditioning system;

FIG. 4 is a part vertical, cross-sectional view of the relationship between the air bag and an air conditioning system;

DETAILED DESCRIPTION OF THE PREFERRED EMBODIMENT

Figure 2A:
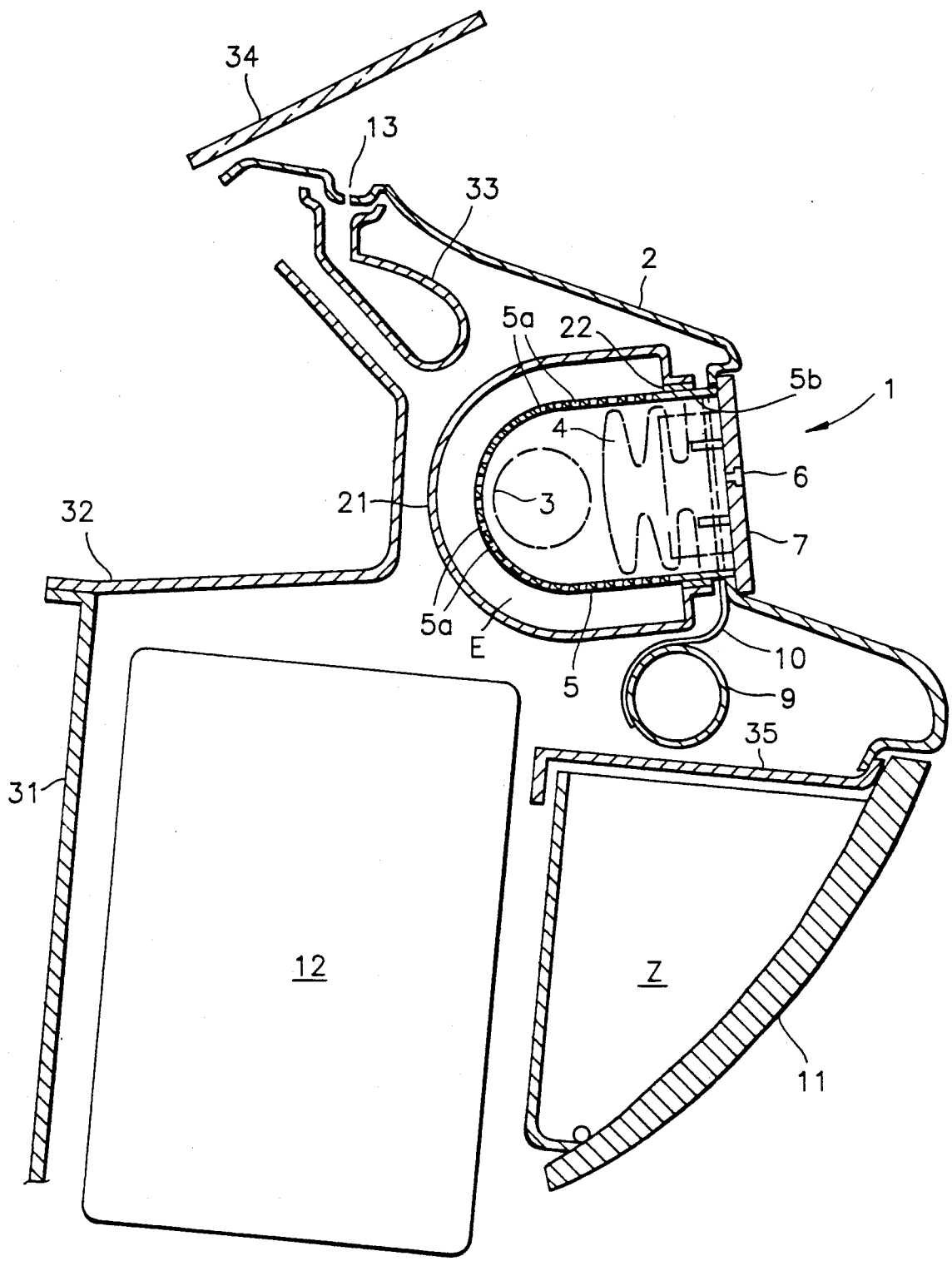
FIGS. 2a and 2b are vertical cross-sectional views of slightly different versions of the air bag structure as it appears along a line II—II of FIG. 1.

Referring now to FIG. 1, an air bag unit 1 for a passenger seated on a front seat which is located next to a driver's seat is illustrated. The air bag unit 1 is provided in an instrument panel 2 so as to face the passenger. The air bag unit 1 is of an "aspiration" type, and has a casing 5 surrounding it when the air bag thereof is not inflated. The casing is provided with a plurality of holes 5a. Air bag unit 1, moreover, accommodates an inflator 3 and an air bag 4 folded to a compact size, as shown in FIG. 6.

On the front surface of the air bag unit 1, there are provided an upper lid 6 and a lower lid 7, which are, respectively, hingedly supported at an upper end and a lower end of a front opening 5b in the casing 5.

By this construction, when the vehicle is involved in a collision, the inflator 3 is ignited, and air is introduced through holes 5a as the air bag 4 inflates. The lids 6 and 7 are then pressed by the air bag to open. Ultimately, the air bag 4 expands enough to press against and hold a passenger, seated in a front seat, against the seat.

Figure 6:
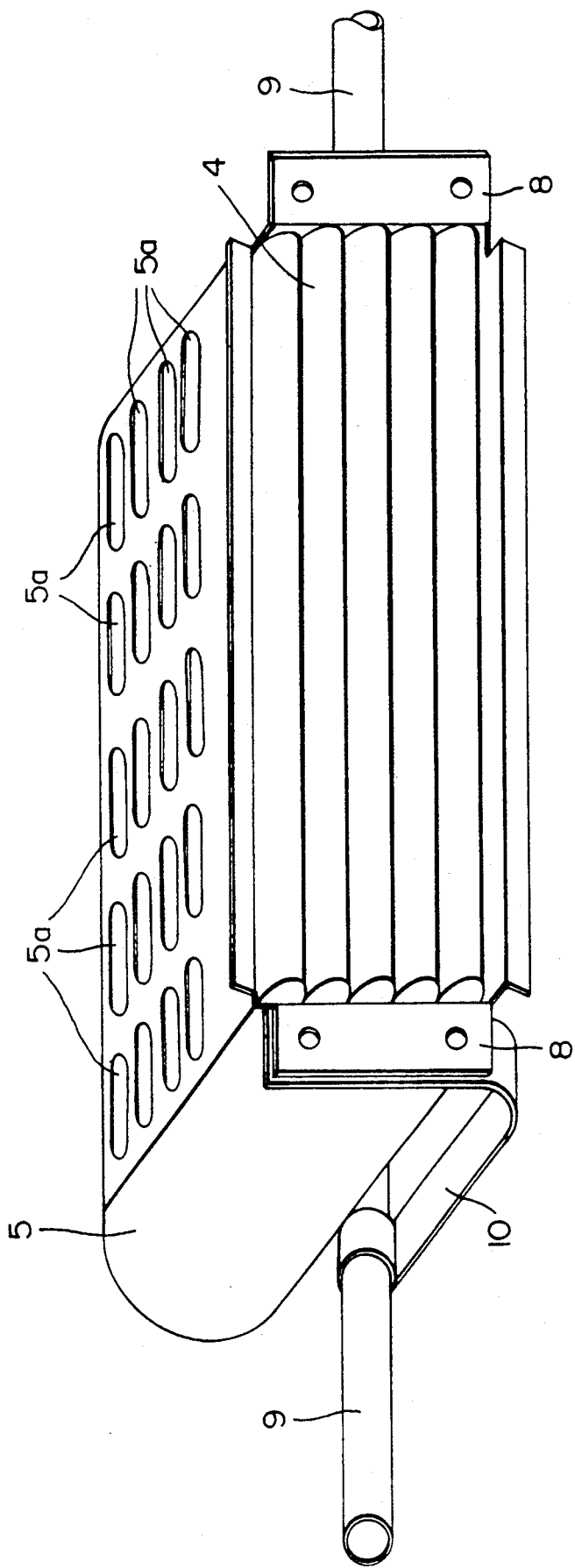
FIG. 6 is an enlarged view showing a casing for the air bag.

As shown in FIGS. 1, 3 and 6, on a right side wall and a left side wall of the casing 5, there are fixed support brackets 8. Each support bracket 8 is connected with an upper end of a substantially L-shaped connecting bracket 10, which is extended upwardly from a steering support shaft 9. The steering support shaft 9 is fixed to cowl side panels (not shown), at both, opposite ends, through brackets 16, 16. The central portion of the steering support shaft 9 is fixed to a floor panel 18 through a support element 17.

A glove box 11 is disposed underneath the air bag unit 1, and a cooler unit 12 is disposed in front of the glove box 11. The cooler unit 12 delivers air-conditioned air to an upper air outlet 13, which is located on an upper horizontal surface of the instrument panel 2, a central air outlet 14 which is located at a central vertical portion of the instrument panel 2, and side air outlets 15A and 15B which are located on right and left vertical ends of the instrument panel 2.

Driver side knee protectors 19A and 19B are provided for the driver, and passenger side knee protectors 20A and 20B are provided for the passenger seated next to the driver.

The casing 5 is surrounded by an air-conditioner duct 21, which is spaced from the casing 5 by a predetermined distance. In accordance with the present invention, the curved wall bounding the outside of air-conditioner duct 21 acts as a cover element for the casing 5. The air-conditioner duct 21 is supported on and connected to the casing 5 by means of seal element 22 so that air inside the air-conditioner duct 21 does not leak out. By such a construction, a predetermined amount of air space E can be kept around the casing 5. Since the air-conditioner duct 21 delivers air from the outside of the vehicle, the outer surface of the casing 5 is preferably coated with a rustproof coating material.

The outer end of the air-conditioner duct 21 is connected with a side air outlet 15B, and a side louver 23B is attached at the front end of the side air outlet 15B. The inner end of the air-conditioner duct 21 is formed with a cylindrical connecting opening 24. The connecting opening 24 is connected with a connecting opening 27 of a center duct 26. The center duct 26 has the central air outlet 14, on the front end of which center louvers 25A and 25B are attached. The center duct 26 has another connecting opening 29 on an opposite side of the connecting opening 27. The center duct 26 is connected with a driver side duct 28 through the connecting opening 29. The driver side duct 28 has the side air outlet 15A, and on the front end of the side air outlet 15A is attached a side louver 23A. The center duct 26 has one more connecting opening 30 provided in its front surface for connecting the center duct 26 with the cooler unit 12.

A dash lower panel 31 and a dash upper panel 32 are provided to partition the engine room and the passenger room. A defrost nozzle 33 is provided under the upper air outlet 13. Reference number 34 designates a windshield glass, while reference 35 indicates an upper member which partitions the glove box 11 and inside space of the instrument panel 2.

By arranging the air bag structure as described above, the air-conditioner duct 21 is located around the casing of the air bag unit 1. The curved wall, which encloses air-conditioner duct 21, acts as a cover member for the casing 5, which, therefore, maintains a sufficient air space E. When the vehicle undergoes a collision, the inflator 3 is ignited, and the air bag 4 is inflated. At this time, a sufficient amount of air, from outside of the vehicle, can be introduced from the air space E through the plurality of holes 5a into the air bag 4. Therefore, the air bag 4 expands smoothly to hold the passenger against the front seat.

The cross-sectional area of the air duct 21 for the air space E is approximately 5000 square millimeters. The gap between the curved wall of the air duct 21 and the casing 5, forming the air space E, is preferably greater than 20 millimeters. The volume of the air duct 21 is approximately 7.0 liters, and the volume contained in the casing 5 is approximately 4.5 liters. The volume of the air bag 4 is about 200 liters, when the air bag is in an expanded condition. The total opening area of the holes 5a is about 7400 square millimeters, and the total number of holes 5a, in the preferred embodiment, is 110.

The above dimensions were determined so that the air bag conforms to a standard which requires the air bag 4 to be completely expanded within about 50 milliseconds (msec) after ignition of the inflator 3. This 50 msec time is determined based on the fact that the average measured time between the beginning of a collision and the instant when the body of a passenger collides with the dashboard or windshield of the vehicle is 100 msec.

In addition, since not only is the air-conditioner duct 21 utilized as a conventional air duct, but also the curved wall forming the duct 21 is used as a cover, the flexibility in layout increases and also usable space in the instrument panel increases.

Figure 2B:
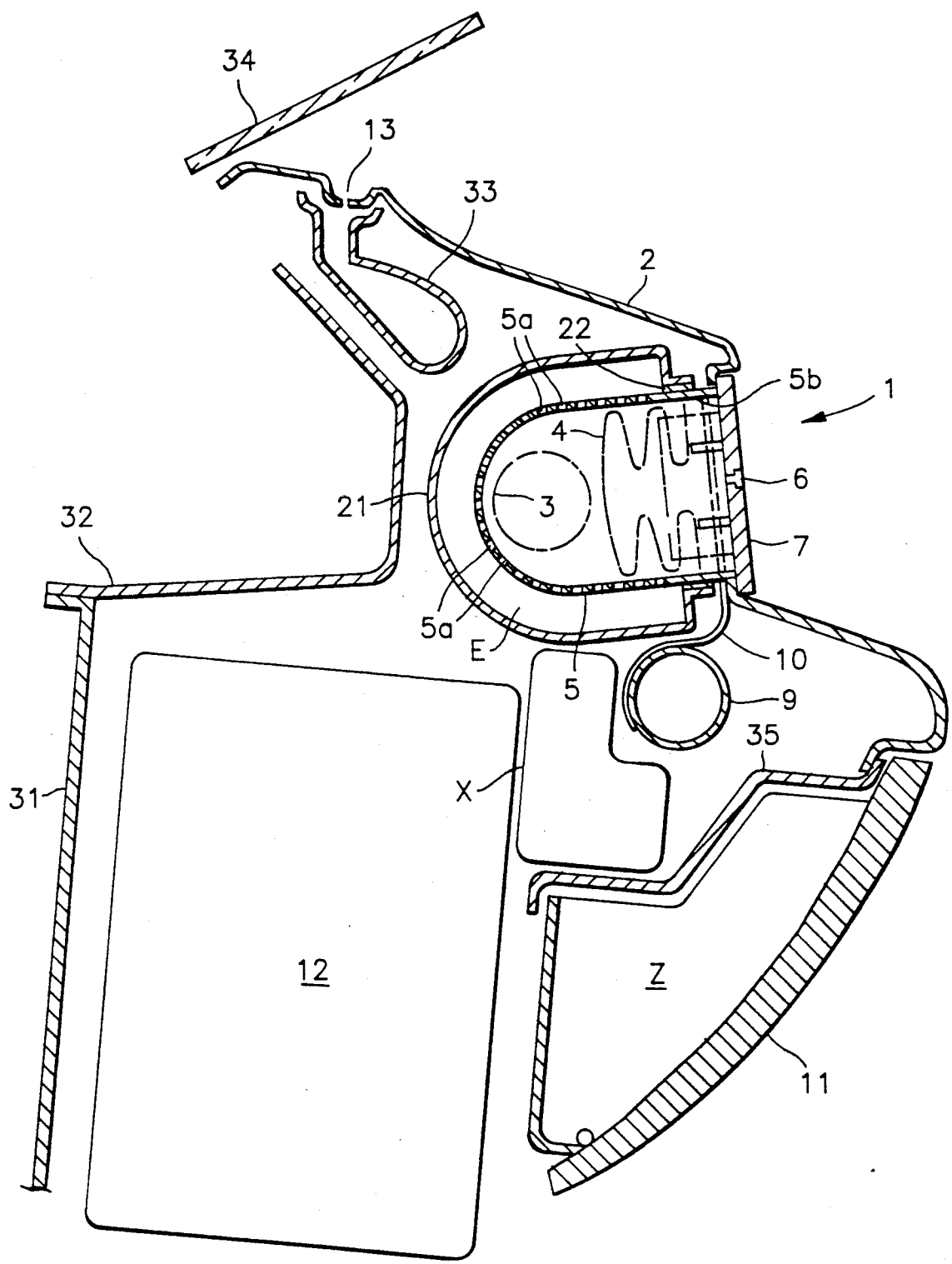
Figure 5:
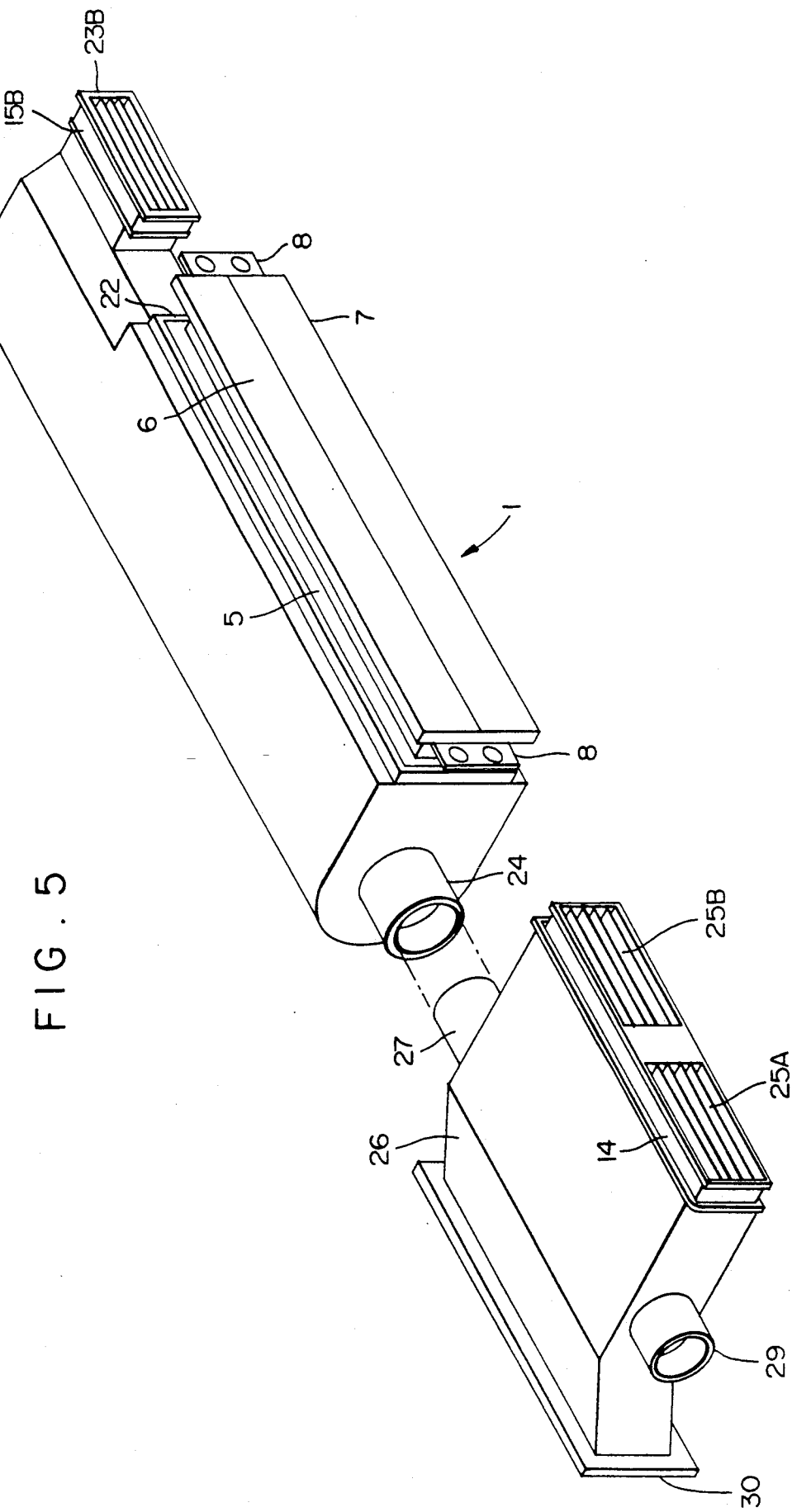
FIG. 5 is a perspective view showing the air conditioning system.

As shown in FIGS. 2a and 2b two examples of layouts in which the cover, i.e., the wall of duct 21, and the air-conditioner duct are not and are separately provided, respectively. In the example shown in FIG. 2b, the air-conditioner duct X is located underneath the air bag unit 1 and the upper member 35 is lowered to invade the space Z for the glove box 11. Accordingly, volume Z of the glove box 11 has to be partially reduced. However, according to the present invention, it is not necessary to use a wall of the air-conditioner duct as a cover surrounding the case 5. Other elements could be applicable.

Although the present invention has been described with reference to a specific preferred embodiment, changes will be apparent to those skilled in the art. Such changes are intended to come within the meaning and range of equivalency of the claims.

I claim:

1. An air bag structure for an automotive vehicle which is mounted on an instrument panel in front of a passenger seated on a front seat of the vehicle, comprising:
   an inflator for generating gas,
   an air bag for receiving the gas generated by the inflator,
   a casing for enclosing the inflator and the air bag, said casing including a plurality of aspiration holes formed therein through which air is introduced into the air bag when the air bag is inflated by ignition of said inflator, and
   a cover member for surrounding and covering the casing, said cover member being spaced from the casing so that air is introduced into the air bag, through the aspiration holes, from an air passage between the cover member and the casing.

2. An air bag structure in accordance with claim 1, wherein the cover member and the casing are sealed, and said air passage is formed between the cover member and the casing so that the air passage can be used as an air-conditioner duct.

3. An air bag structure in accordance with claim 1, wherein the casing is accommodated in the cover member.

4. An air bag structure in accordance with claim 1, wherein said cover member is spaced from the casing by a predetermined gap.

5. An air bag structure in accordance with claim 4, wherein said predetermined gap is greater than 20 millimeters.

6. An air bag structure in accordance with claim 1, wherein a cross-sectional area of the air passage between the cover member and the casing is around 5000 square millimeters.

7. An air bag structure in accordance with claim 1, wherein the air passage between the cover member and the casing is determined so that the air bag is completely expanded within 50 milliseconds after ignition of the inflator.

8. An air bag structure in accordance with claim 1, wherein the casing is connected with a shaft for supporting a steering shaft.

9. An air bag structure in accordance with claim 1, wherein the casing has an open end on which a lid member is hingedly supported, the lid opening when the air bag inflates.

10. An air bag structure for an automotive vehicle which is mounted on an instrument panel in front of a passenger seated on a front seat of the vehicle, comprising:
    an inflator for generating gas,
    an air bag for receiving the gas generated by the inflator,
    a casing for enclosing the inflator and the air bag, said casing including a plurality of aspiration holes formed therein through which air is introduced into the air bag when the air bag is inflated by ignition of said inflator, and
    a cover member for surrounding and covering the casing and forming an air passage between the cover member and the casing, said air passage being communicated to outside of the vehicle.

* * * * *

UNITED STATES PATENT AND TRADEMARK OFFICE
CERTIFICATE OF CORRECTION

PATENT NO. : 5,085,465

DATED : February 4, 1992

INVENTOR(S) : Isao HIRASHIMA

It is certified that error appears in the above-identified patent and that said Letters Patent is hereby corrected as shown below:

On the title page, item [75], the correct spelling of the inventor's name is --Hirashima--.

Signed and Sealed this

Twenty-first Day of September, 1993

*Attest:*

*Attesting Officer*

BRUCE LEHMAN

Commissioner of Patents and Trademarks